United States Patent
Miyagi et al.

(10) Patent No.: US 7,532,364 B2
(45) Date of Patent: May 12, 2009

(54) IMAGE PROCESSING DEVICE, IMAGE OUTPUT APPARATUS, AND STORAGE MEDIUM STORING IMAGE PROCESSING PROGRAM

(75) Inventors: Takashi Miyagi, Ebina (JP); Naosuke Ino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 666 days.

(21) Appl. No.: 11/076,002

(22) Filed: Mar. 9, 2005

(65) Prior Publication Data

US 2006/0050318 A1   Mar. 9, 2006

(30) Foreign Application Priority Data

Sep. 7, 2004   (JP) ............... 2004-259494

(51) Int. Cl.
*G06K 15/00* (2006.01)
*H04N 1/405* (2006.01)
*H04N 1/40* (2006.01)

(52) U.S. Cl. .................... 358/3.13; 358/3.03

(58) Field of Classification Search ............ 358/3.13, 358/533; 347/251, 240
See application file for complete search history.

(56) References Cited

U.S. PATENT DOCUMENTS

| 6,201,614 | B1 * | 3/2001 | Lin ...................... 358/3.13 |
| 6,281,924 | B1 * | 8/2001 | Tsuzuki ................ 347/251 |
| 7,009,737 | B2 * | 3/2006 | Morimatsu ............. 358/3.14 |
| 7,270,388 | B2 * | 9/2007 | Mitsuzawa et al. ......... 347/9 |

FOREIGN PATENT DOCUMENTS

JP   2002-16803   1/2002

* cited by examiner

*Primary Examiner*—Twyler L Haskins
*Assistant Examiner*—Fan Zhang
(74) *Attorney, Agent, or Firm*—Fildes & Outland, P.C.

(57) ABSTRACT

An image processing device converts multi-gradation image data to low-gradation image data for outputting an image of a dot pattern that is formed by a high-density first part formed in a band shape by dots connected in a predetermined direction and a low-density second part formed by randomly arranged dots.

8 Claims, 12 Drawing Sheets

FIG. 7

NOZZLE ARRAYING DIRECTION →

PAPER FEED DIRECTION ↓

| 32 | 31 | 30 | 29 | 28 | 27 | 32 | 31 | 30 | 29 | 28 | 27 | 32 | 31 | 30 | 29 | 28 | 27 |
|----|----|----|----|----|----|----|----|----|----|----|----|----|----|----|----|----|----|
| 25 | 26 | 21 | 22 | 23 | 24 | 25 | 26 | 21 | 22 | 23 | 24 | 25 | 26 | 21 | 22 | 23 | 24 |
| 16 | 15 | 20 | 19 | 18 | 17 | 16 | 15 | 20 | 19 | 18 | 17 | 16 | 15 | 20 | 19 | 18 | 17 |
| 11 | 12 | 13 | 14 | 9 | 10 | 11 | 12 | 13 | 14 | 9 | 10 | 11 | 12 | 13 | 14 | 9 | 10 |
| 9 | 8 | 7 | 12 | 11 | 10 | 9 | 8 | 7 | 12 | 11 | 10 | 9 | 8 | 7 | 12 | 11 | 10 |
| 2 | 3 | 4 | 5 | 6 | 1 | 2 | 3 | 4 | 5 | 6 | 1 | 2 | 3 | 4 | 5 | 6 | 1 |
| 31 | 30 | 29 | 28 | 27 | 32 | 31 | 30 | 29 | 28 | 27 | 32 | 31 | 30 | 29 | 28 | 27 | 32 |
| 26 | 21 | 22 | 23 | 24 | 25 | 26 | 21 | 22 | 23 | 24 | 25 | 26 | 21 | 22 | 23 | 24 | 25 |
| 15 | 20 | 19 | 18 | 17 | 16 | 15 | 20 | 19 | 18 | 17 | 16 | 15 | 20 | 19 | 18 | 17 | 16 |
| 12 | 13 | 14 | 9 | 10 | 11 | 12 | 13 | 14 | 9 | 10 | 11 | 12 | 13 | 14 | 9 | 10 | 11 |
| 8 | 7 | 12 | 11 | 10 | 9 | 8 | 7 | 12 | 11 | 10 | 9 | 8 | 7 | 12 | 11 | 10 | 9 |
| 3 | 4 | 5 | 6 | 1 | 2 | 3 | 4 | 5 | 6 | 1 | 2 | 3 | 4 | 5 | 6 | 1 | 2 |
| 30 | 29 | 28 | 27 | 32 | 31 | 30 | 29 | 28 | 27 | 32 | 31 | 30 | 29 | 28 | 27 | 32 | 31 |
| 21 | 22 | 23 | 24 | 25 | 26 | 21 | 22 | 23 | 24 | 25 | 26 | 21 | 22 | 23 | 24 | 25 | 26 |
| 20 | 19 | 18 | 17 | 16 | 15 | 20 | 19 | 18 | 17 | 16 | 15 | 20 | 19 | 18 | 17 | 16 | 15 |
| 13 | 14 | 9 | 10 | 11 | 12 | 13 | 14 | 9 | 10 | 11 | 12 | 13 | 14 | 9 | 10 | 11 | 12 |
| 7 | 12 | 11 | 10 | 9 | 8 | 7 | 12 | 11 | 10 | 9 | 8 | 7 | 12 | 11 | 10 | 9 | 8 |
| 4 | 5 | 6 | 1 | 2 | 3 | 4 | 5 | 6 | 1 | 2 | 3 | 4 | 5 | 6 | 1 | 2 | 3 |

IMAGE PROCESSING DEVICE, IMAGE OUTPUT APPARATUS, AND STORAGE MEDIUM STORING IMAGE PROCESSING PROGRAM

BACKGROUND OF THE INVENTION

1. Field of the Invention

This invention relates to an image processing device, an image output apparatus, and a storage medium storing an image processing program, and particularly to an image processing device, an image output apparatus, and a storage medium storing an image processing program for converting multi-gradation image data to low-gradation image data.

2 Description of the Related Art

An ink jet printer that has a recording head having plural nozzles arrayed therein and ejects liquid ink drops from the nozzles to record an image, has been broadly used. The ink jet printer has a simple structure, generates small printing sound, and can record a multi-gradation image such as a photographic image with high image quality.

Recently, a printer that has a relatively elongated recording head to enable high-speed print has been developed. Such a printer has an advantage that it can perform high-speed print, but it has a problem that since it is difficult to maintain uniformity of ejection characteristics (ejected ink drop volume and direction of ejection) of the nozzles because of the elongation, the image quality is lowered. Specifically, in a portion where large dots exist or where adjacent dots are close to each other, the density is higher than in other parts and black streaks occur. On the other hand, in a portion where small dots exist or where adjacent dots are away from each other, the density is lower than in other parts and white streaks occur. The unevenness of the ejection characteristics of the nozzles causes not only the black streaks and white streaks but also imbalance of density (density gradient).

In a PWA (Partial Width Array) ink jet printer that performs printing by moving a recording head into a main scanning direction while moving a recording sheet into a sub scanning direction, a multipass recording system is broadly employed. In the multipass recording system, a recording medium is minutely moved in the nozzle arraying direction of the recording head and the recording head is caused to scan plural times (i.e., perform multipass scanning) in a direction intersecting the nozzle arraying direction, thereby complementarily recording a thinned image in the same region on the recording medium with different nozzle groups to complete an image. This disperses the unevenness of the ejection characteristics of each nozzle of the recording head and the lowering of the image quality is prevented. However, in a so-called FWA (Full Width Array) ink jet printer that has an elongated recording head having a width substantially equal to the width of the recording sheet and performs recording by carrying only the recording medium while fixing the recording head, since multipass print cannot be carried out, the unevenness of the ejection characteristics of the nozzles is a particularly serious problem.

To address such a problem, as an apparatus that makes density unevenness and streaks inconspicuous in the case of using a printer having different output accuracies in the main scanning direction and in the sub scanning direction, an image processing device has been proposed that sets a reference threshold array in dither processing to provide partially acyclic threshold array characteristics in a region where the gradation shifts relatively from intermediate gradation to high gradation within a prescribed threshold range and to provide anisotropic threshold array characteristics that allow preferential connection and sequential growth of dots in a scanning direction where the output accuracy of the printer is relatively low (see, for example, Patent Reference 1).

Patent Reference 1: JP-A-2002-16803

However, if printing is performed on the basis of image data processed by using the above-described conventional technique of the image processing device, there is a problem that a linear pattern that does not exist in the original image, that is, so-called worm texture, tends to emerge in an intermediate gradation part of an image having scarce subtle changes of color. This is because the reference threshold array in dither processing is set to provide anisotropic threshold array characteristics that allow connection and sequential growth of dots. Moreover, in the above-described image processing device, the problem of density gradient due to the unevenness of the ink ejection characteristics is not taken into account.

SUMMARY OF THE INVENTION

This invention has been made in view of the above circumstances and provides an image processing device, an image output apparatus, and a storage medium storing an image processing program that enable restraining the occurrence of streaks due to the unevenness of output characteristics of the image output apparatus or making the skreaks inconspicuous to improve the image quality.

According to an aspect of this invention, an image processing device converts multi-gradation image data to low-gradation image data for outputting an image of a dot pattern that is formed by a high-density first part formed in a band shape by dots connected in a predetermined direction and a low-density second part formed by randomly arranged dots.

BRIEF DESCRIPTION OF THE DRAWINGS

Embodiments of the invention will be described in detail based on the following figures, wherein:

FIG. 6A shows an ideal dot arrangement having no difference in the direction of ejection from nozzles. FIG. 6B shows a case where the direction of ejection from nozzles is not uniform and dots in the third column are shifted to the right and arranged at positions indicated by a broken line;

FIG. 7 shows an example in the case where the dither table is shifted by k columns (k being equal to or more than 1 and less than 6) into the nozzle arraying direction in dither processing;

DETAILED DESCRIPTION OF THE INVENTION

Hereinafter, embodiments of this invention will be described in detail with reference to the drawings.

First Embodiment

Figure 1:
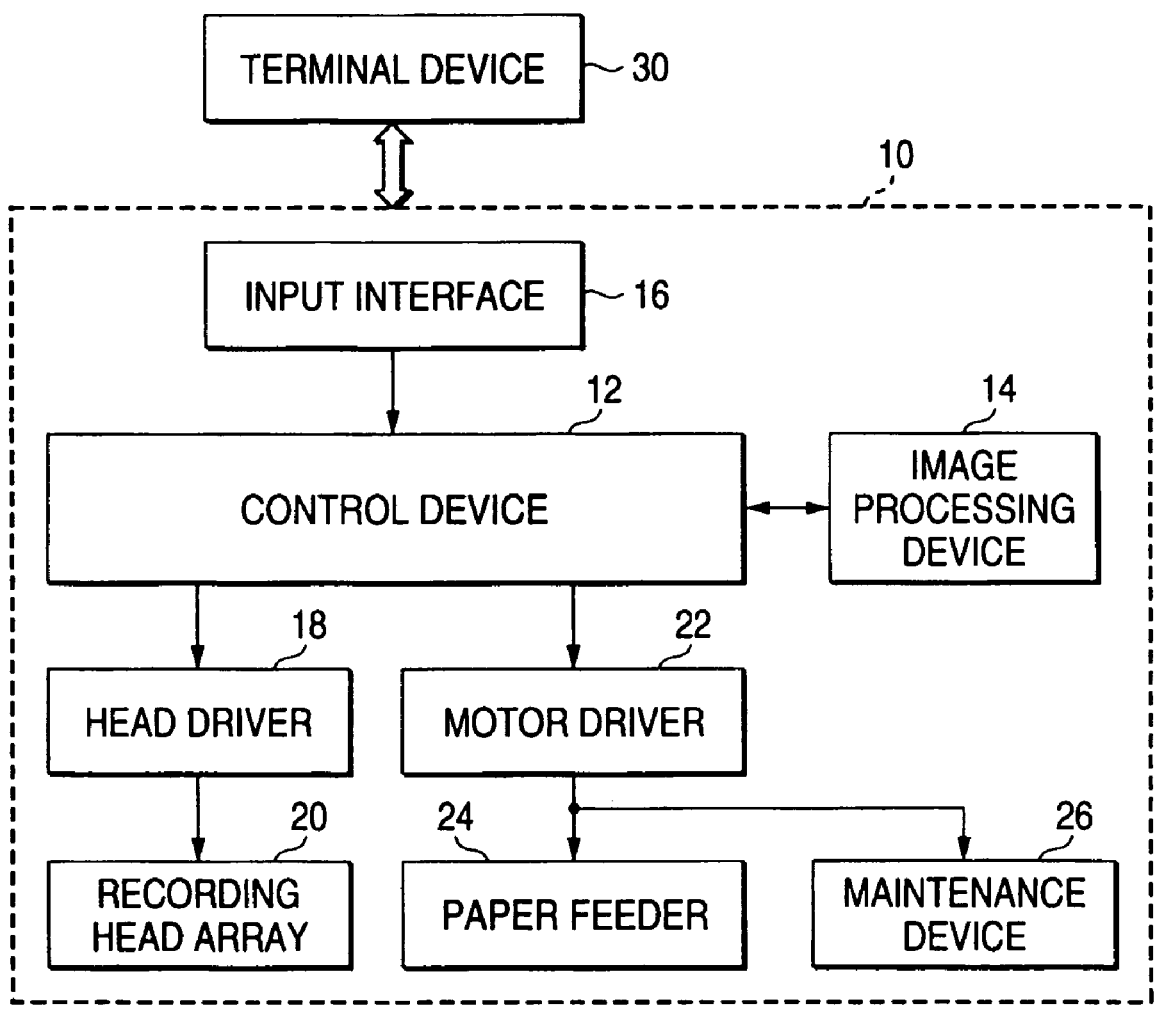
FIG. 1 is a block diagram showing a main structure of an ink jet-type image output apparatus according to a first embodiment of this invention.

FIG. 1 is a block diagram showing a main structure of an ink jet-type image output apparatus 10 according to a first embodiment of this invention. The image output apparatus 10 includes a control device 12, an image processing device 14, an input interface 16, a head driver 18, a recording head array 20, a motor driver 22, a paper feeder 24, and a maintenance device 26.

The control device 12 includes a CPU, ROM and RAM. The CPU executes a program code stored in the ROM, thereby controlling the whole image output operation of the image output apparatus 10.

The input interface 16 is connected to an external terminal device 30 and inputs multi-gradation image data including plural image data from the terminal device 30. The inputted multi-gradation image data is outputted to the control device 12 and stored into the RAM of the control device 12.

The image processing device 14 converts the multi-gradation image data inputted from the terminal device 30 to low-gradation image data (in this case, binary image data). The binary image data acquired by the conversion is outputted to the control device 12. The control device 12 outputs a control signal to the head driver 18 and the motor driver 22 on the basis of the binary image data. Thus, an image is outputted.

The multi-gradation image data used in this embodiment is digital data including eight bits representing the gradation of each of many pixels constituting an original image (image having various densities). It represents a value within a range of 0 to 255. In this embodiment, since black data (maximum density data) in the multi-gradation image data is expressed by "0" and white data (minimum density data) is expressed by "255", a pixel has a higher density as the value of the multi-gradation image data is closer to 0, while a pixel has a lower density as the value is closer to 255. The image processing device 14 converts this 8-bit multi-gradation image data to binary image data, which is either black data "0" forming a dot in image forming processing or white data "1" not forming a dot in the image forming processing.

In the recording head array 20, plural nozzles that have a width equal to the width of a recording sheet and that eject ink drops are arrayed. The recording head array 20 is connected with the head driver 18 and is driven by the head driver 18. The head driver 18 is supplied with electric power for driving the recording head array 20 from a power source, not shown. The head driver 18 electrifies a pixel provided corresponding to each nozzle of the recording head array 20 in accordance with a control signal from the control device 12 and thus causes each nozzle to eject ink drops.

The motor driver 22 is connected to the paper feeder 24 and the maintenance device 26, and drives the paper feeder 24 and the maintenance device 26 in accordance with a control signal from the control device 12.

The paper feeder 24 is driven by the motor driver 22 and carries a paper as a recording medium. The image output apparatus 10 according to this embodiment forms an image by fixing the recording head array 20 and causing it to eject ink drops while carrying only the recording medium.

The maintenance device 26 is driven by the motor driver 22 and cleans the recording head array 20 and the like.

Figure 2:
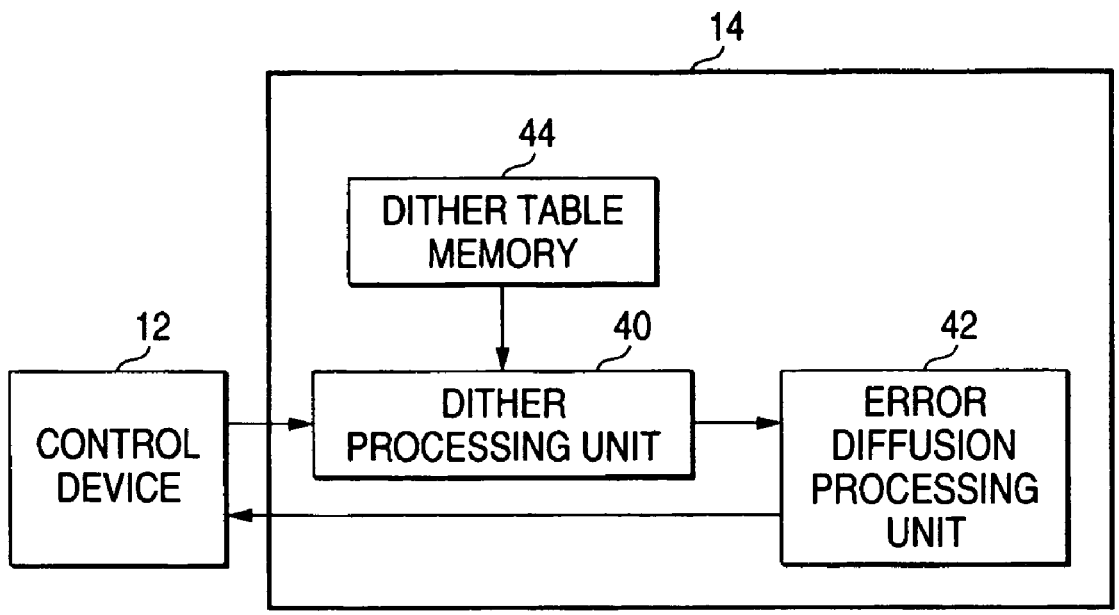
FIG. 2 is a block diagram showing a functional structure of an image processing device according to the first embodiment.

FIG. 2 is a block diagram showing a functional structure of the image processing device 14. The image processing device 14 includes a dither processing unit 40, an error diffusion processing unit 42, and a dither table memory 44.

The dither processing unit 40 performs dither processing on multi-level image data inputted via the input interface 16 by using a threshold value table (hereinafter referred to as dither table) that is stored in the dither table memory 44 and is used for dither processing. The dither processing unit 40 performs dither processing on multi-gradation image data having a gradation value of 0 (black) to a gradation value preset by the image processing device 14 (this gradation value being a value ranging from 0 to 255 and hereinafter referred to as intermediate threshold value X), of the multi-gradation image data. By this dither processing, the multi-gradation image data of 0 to the intermediate threshold value X is binarized to 0 or X. Therefore, no processing is performed here on the multi-gradation image data having a gradation value exceeding the intermediate threshold value X.

In the dither table memory 44, the dither table used for the dither processing by the dither processing unit 40 is stored as described above. This dither table is a matrix table in which numeric values of 1 to the intermediate threshold values X are arrayed in a matrix form as dither threshold values. In this example, the intermediate threshold value X is the maximum value in the dither table.

Figure 3:
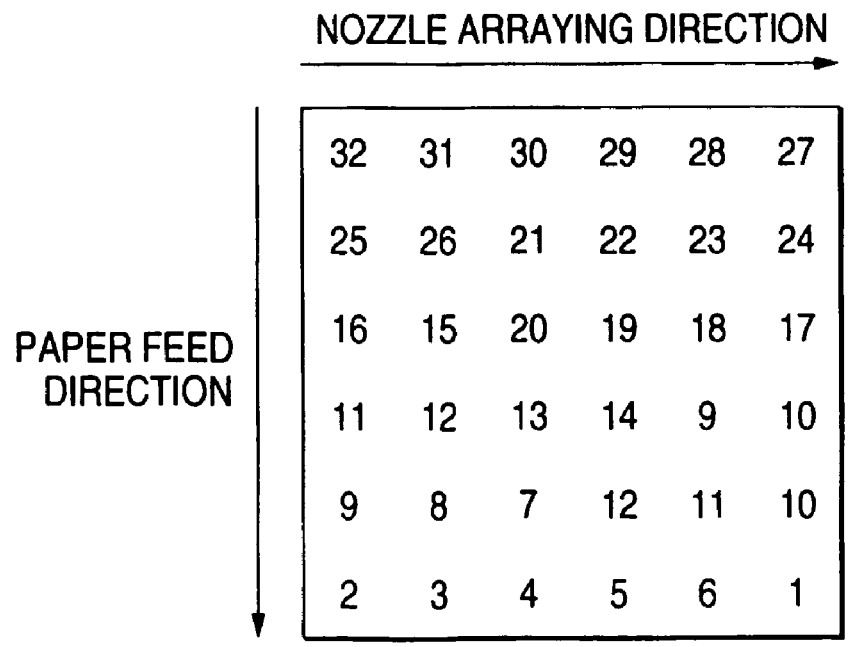
FIG. 3 shows an example of threshold value table (dither table) used for dither processing.

FIG. 3 shows an example of the dither table stored in the dither table memory 44. This dither table is a dither table of six rows by six columns. Its horizontal direction (direction of row) corresponds to the nozzle arraying direction (main scanning direction) of the recording head array 20, and its vertical direction (direction of column) corresponds to the paper feed direction (sub scanning direction). The dither threshold values are arranged to realize a line of dots connected in the nozzle arraying direction from an upper left end part with its width gradually increasing. In this dither table, the dither threshold values in the second and subsequent rows are arranged slightly randomly in each row in order to prevent cyclicity due to the arraying of the dither threshold values.

The error diffusion processing unit 42 performs error diffusion processing on the multi-gradation image data having the gradation values of 0 and X to 255 received form the dither processing unit 40 and converts the multi-gradation image data to binary image data of 0 (black data) or 1 (white data).

The dither processing unit 40 and the error diffusion processing unit 42 may be constituted by a microcomputer that executes their functions through a program, or maybe constituted by hardware having their functions. Hereinafter, a case where the dither processing unit 40 and the error diffusion processing unit 42 are constituted by a microcomputer will be described as an example.

Figure 4:
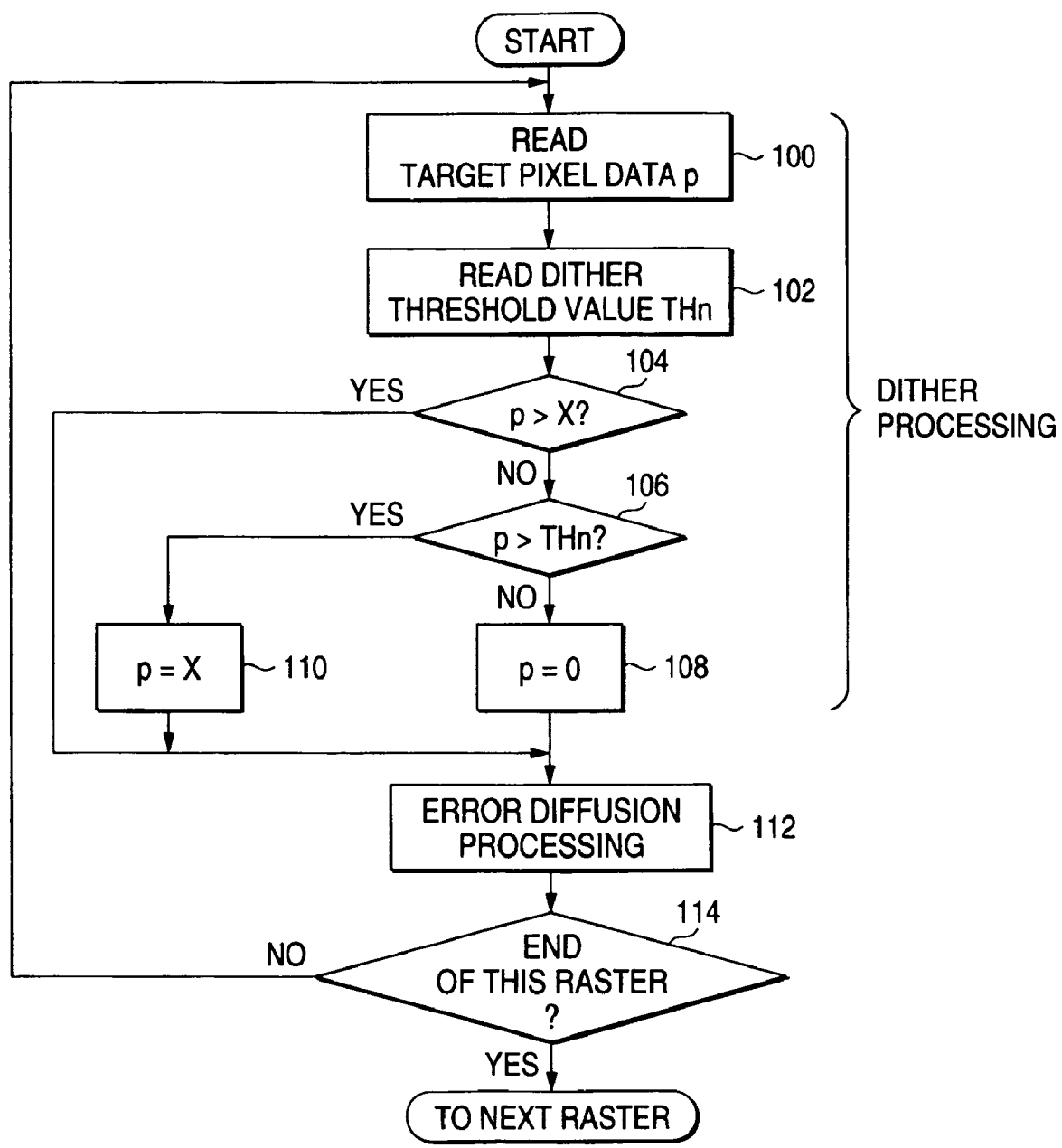
FIG. 4 is a flowchart showing a flow of binarization processing executed by the image processing device according to the first embodiment.

FIG. 4 is a flowchart showing a flow of binarization processing executed by the image processing device 14. The processing of this flowchart is executed for each multi-gradation image data of one raster (one main scanning line)

At step 100, multi-gradation image data (pixel data) that is a processing object is read as target pixel data p from the RAM of the control device 12.

At step 102, a dither threshold value THn corresponding to the target pixel data p is read from the dither table stored in the dither table memory 44. Here, "n" is a subscript indicating each of the dither threshold values arrayed in the dither table. In this example, since the dither table is a matrix table of six rows by six columns, n takes values of 0 to 35.

At step 104, it is judged whether the value of the target pixel data p is more than the intermediate threshold value X or not. If it is judged here that the value of the target pixel data p is equal to or less than the intermediate threshold value X, it is then judged at step 106 whether the value of the target pixel data p is more than the dither threshold value THn or not.

If it is judged at step 106 that the value of the target pixel data p is equal to or less than the dither threshold value THn, 0 is substituted into the value of the target pixel data p at step 108.

On the other hand, if it is judged at step 106 that the value of the target pixel data p is more than the dither threshold value THn, the intermediate threshold value X is substituted into the value of the target pixel data p at step 110.

The processing from steps 102 to 110 is dither processing. This dither processing is performed on multi-gradation image data having gradation values of 0 to the intermediate threshold value X, of the multi-gradation image data, to binarize the multi-gradation image data to 0 or X. Thus, image data of a high-density part (first part) formed in a band shape by dots connected in the nozzle arraying direction is created.

After the dither processing or if it is judged at step 104 that the value of the target pixel data p is more than the intermediate threshold value X, the processing shifts to step 112. That is, of the original multi-gradation image data, each of the multi-gradation image data having the gradation values of 0 to X is converted to 0 or X, and the processing of step 112 is started on the multi-gradation image data having the gradation values of X to 255 with their original gradation values maintained.

At step 112, error diffusion processing is performed. Specifically, when converting the multi-gradation image data to low-gradation image data by target pixel, an error generated in the conversion is diffused to each of peripheral pixels, and the multi-gradation image data of a target pixel is corrected by using a cumulative value of errors diffused in the past conversions with respect to the target pixel. Then, the corrected multi-gradation image data is compared with a threshold value (this threshold value being a predetermined threshold value used for error diffusion processing) and is converted to binary image data (0 or 1). By this processing, image data of a low-density part (second part) formed by randomly arranged dots is created. The binary image data acquired by the error diffusion processing is outputted to the control device 12.

At step 114, it is judged whether the processing on image date of one raster has been completed or not. If it is judged here that the processing on image data of one raster has not been completed, the processing returns to step 100 to read the next pixel data as target pixel data p and repeat the foregoing processing. If it is judged that the processing on image data of one raster has been completed, binarization processing of the next raster is then started.

Figure 5:
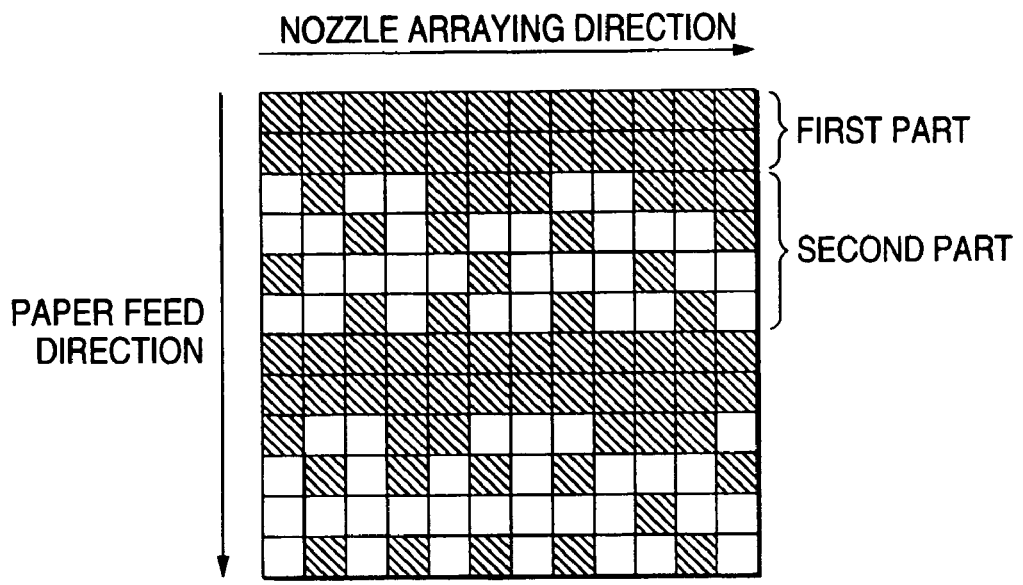
FIG. 5 shows an example of image of binary image data acquired by performing dither processing using the dither table of FIG. 3 and error diffusion processing.

FIG. 5 shows an example of image formed on the basis of binary image data acquired by performing the dither processing with the dither table of FIG. 3 and the error diffusion processing. Each of four six-row-by-six-column regions shown in FIG. 5 corresponds to the matrix of the dither table. Each region is a dot pattern that is formed by a high-density first part formed in a band shape by dots connected in the nozzle arraying direction and a low-density second part formed by randomly arranged dots.

The first part is a part formed by performing the dither processing with the dither table of FIG. 3. The second part is a part formed by performing the error diffusion processing after the dither processing. Since the error diffusion processing is performed after the dither processing, some white blank parts may occur in the first part formed by the dither processing, depending on the state of diffusion of an error. However, even if such white blank parts occur, they are very a few and relatively high density is maintained as a whole.

In the binarization processing, the dither table is used sequentially in the nozzle arraying direction to perform the dither processing. Therefore, the first part is formed not only within each region corresponding to the matrix of the dither table but also in a band shape over plural regions connected in the nozzle arraying direction.

Figure 6A:
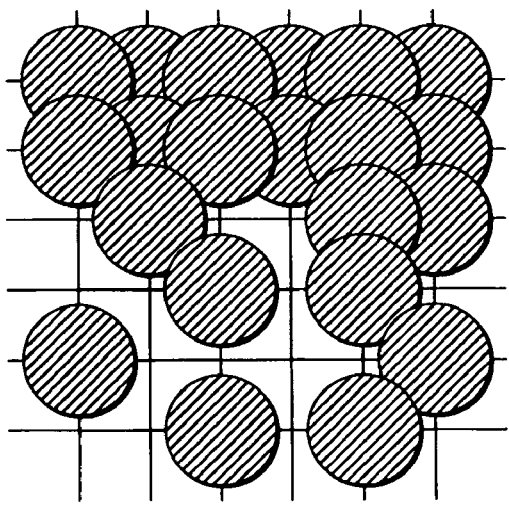
FIGS. 6A and 6B are enlarged views showing dot arrangements in an upper left region of six rows by six columns shown in FIG. 5.
Figure 6B:
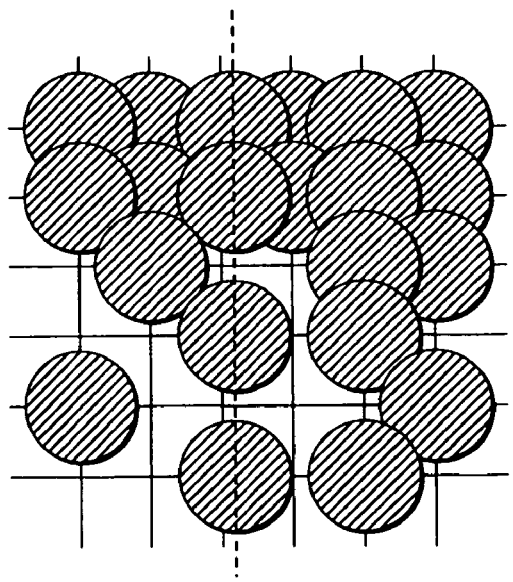

FIGS. 6A and 6B are enlarged views showing dot arrangements in an upper left region of six rows by six columns shown in FIG. 5. FIG. 6A shows an ideal dot arrangement having no difference in the direction of ejection from nozzles. FIG. 6B shows a case where the direction of ejection from nozzles is not uniform and dots in the third column are shifted to the right and arranged at positions indicated by a broken line.

As FIGS. 6A and 6B are compared with each other, it can be understood that in an upper half part having high density in the horizontal direction (that is, first part), the image quality is not affected by any difference in the direction of ink ejection. In the first part, the dots fill the horizontal direction completely, generating no white streaks or black streaks. In this manner, since the first part is a region where the dot density is high and the dot spacing is narrow, streaks are not likely to occur even if the direction of ink ejection is not uniform.

It can also be understood that in a lower half part having low density in the horizontal direction (that is, second part), the image quality is not affected by any difference in the direction of ink ejection from the nozzles. In FIG. 6B, compared with FIG. 6A, the dots in the third column are shifted to the right and a white part on the right side of the broken line is decreased. However, since the dot density is low and the dot spacing is large from the beginning, streaks cannot be seen clearly. In this manner, since the second part is a region where the dot density is low and the dots are dispersed, even if streaks are generated by the difference in the direction of ink ejection, they are not very conspicuous.

In the dot pattern formed by the two parts, a pattern like worm texture is unlikely to occur. A worm texture is a pattern in which connected dots are shifted by a small amount each and continue in this manner. In this invention, since the pattern is cut by the horizontal structure of the first part, a pattern like worm texture is not likely to occur.

In the description of FIGS. 6A and 6B, only the difference in the direction of ink ejection is considered. However, also in the case where the ejected ink volume is not uniform, streaks are not likely to occur or they are not very conspicuous for the same reason as described above.

In the dot pattern formed by the first, part and the second part as described above, a cyclic single line screen-like pattern emerges theoretically. However, if the resolution is high and the screen-like pattern occurs in short cycles, it is hardly visually recognized. If the resolution is not very high, the single line screen-like pattern may be visually recognized but does not bother the user like a worm texture.

As described above, by converting the multi-gradation image data to the binary image data of the dot pattern that is formed by the high-density first part formed in a band shape by dots connected in the predetermined direction and the low-density second part formed by randomly arranged dots, it is possible to restrain the occurrence of streaks due to the unevenness of the ejection characteristics of the nozzles.

In the first embodiment, the example of performing the dither processing by repeatedly using the dither table as shown in FIG. 3 is described. In this case, every time the dither processing on the pixel data of six rasters corresponding to the rows in the dither table is completed, the dither table may be shifted by k columns (here, k being equal to or more than 1 and less than 6) into the nozzle arraying direction and then the dither processing may be performed on the pixel data of the next six rasters, for example, as shown in FIG. 7. Thus, the cyclicity due to the arraying of the dither threshold values in the dither table can be prevented from occurring in the nozzle arraying direction. That is, the seams between the six-by-six regions can be prevented from being visually recognized. Even if the dither table is used in this manner, the first part is formed in a band shape over plural regions connected in the nozzle arraying direction.

Also, in the first embodiment, the example of performing the dither processing by using the dither table of six rows by six columns is described. The dither table is not limited to this and dither tables having other numbers of rows and columns may be used.

The dither threshold values arrayed in the dither table shown in FIG. 3 is an example and the numeric values and arrangement are not limited to these. Also, when performing the dither processing, values acquired by multiplying the dither threshold values arranged in the dither table by a predetermined coefficient may be used.

Second Embodiment

In the first embodiment, the example of performing the processing by using the predetermined dither table and intermediate threshold value X is described. However, in this embodiment, an example of performing the processing while changing the ratio of the first part and the second part in the dot pattern with variable dither table and intermediate threshold value X will be described.

Figure 8:
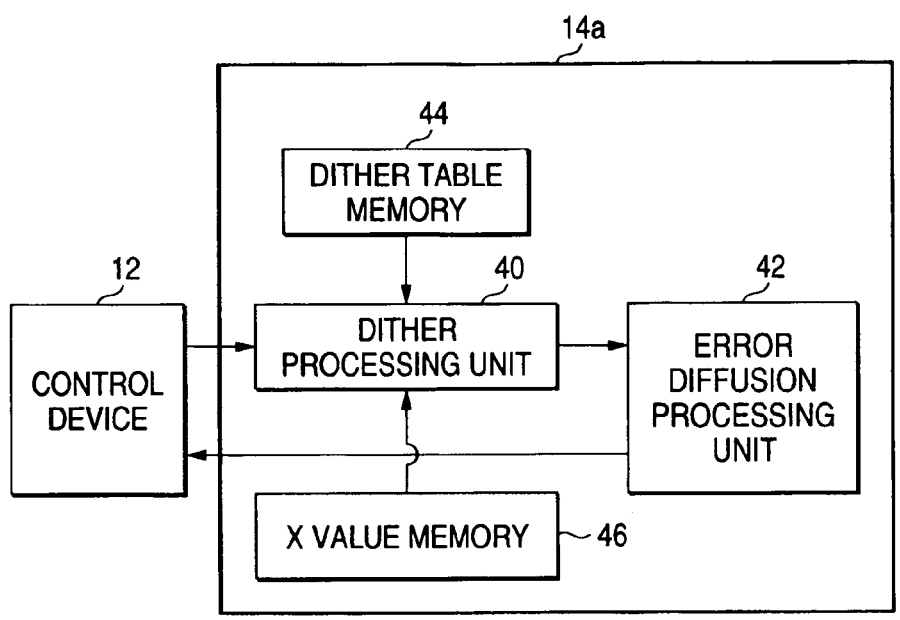
FIG. 8 is a block diagram showing a functional structure of an image processing device according to a second embodiment.

The structure of an image output apparatus 10 according to this embodiment is similar to the structure in the first embodiment and therefore the description is omitted. A functional structure of an image processing device according to this embodiment is shown in FIG. 8. As shown in FIG. 8, an image processing device 14a according to this embodiment has an X value memory 46 in addition to the structure of the image processing device 14 of the first embodiment.

Figure 9:
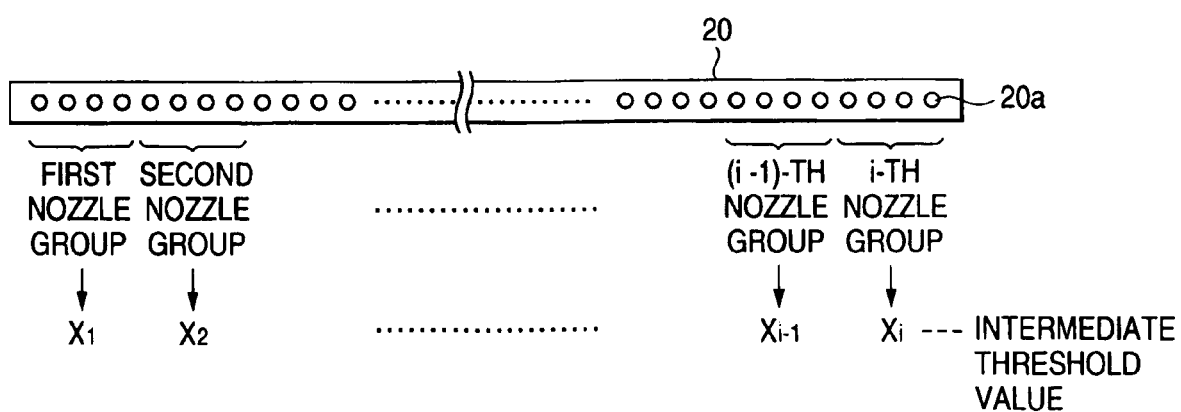
FIG. 9 shows the relation between each nozzle group acquired by dividing nozzles arrayed in a recording head array into plural groups in the order of arraying and an intermediate threshold value corresponding to ejection characteristics of each nozzle group.

In the X value memory 46, intermediate threshold values Xi corresponding to each of nozzle groups formed by dividing nozzles 20a arrayed in the recording head array 20 into plural groups in the order of arraying are stored, as shown in FIG. 9. "i" is a subscript indicating each of the nozzle groups. As the intermediate threshold value Xi for each nozzle group, a suitable value is found and stored in advance by experiment or the like.

In the dither table memory 44 of this embodiment, a reference dither table corresponding to a predetermined intermediate threshold value X that is to be a reference is stored. As in the first embodiment, the maximum value of the dither threshold values in the reference dither table has the same value as the intermediate threshold value X.

An example of determination method for the intermediate threshold value Xi corresponding to each nozzle group will now be described.

First, multi-gradation image data representing images having an area coverage (dot density per unit area) sequentially changed, for example, by 5% from 5% to 100% is prepared. Each of the multi-gradation image data is binarized as in the first embodiment while the intermediate threshold value is changed, and binary image data for each intermediate threshold value is thus generated. Gradation step images are actually formed on the basis of each of the generated binary image data and the density (optical density) of each of the formed gradation step images is measured.

Figure 10:
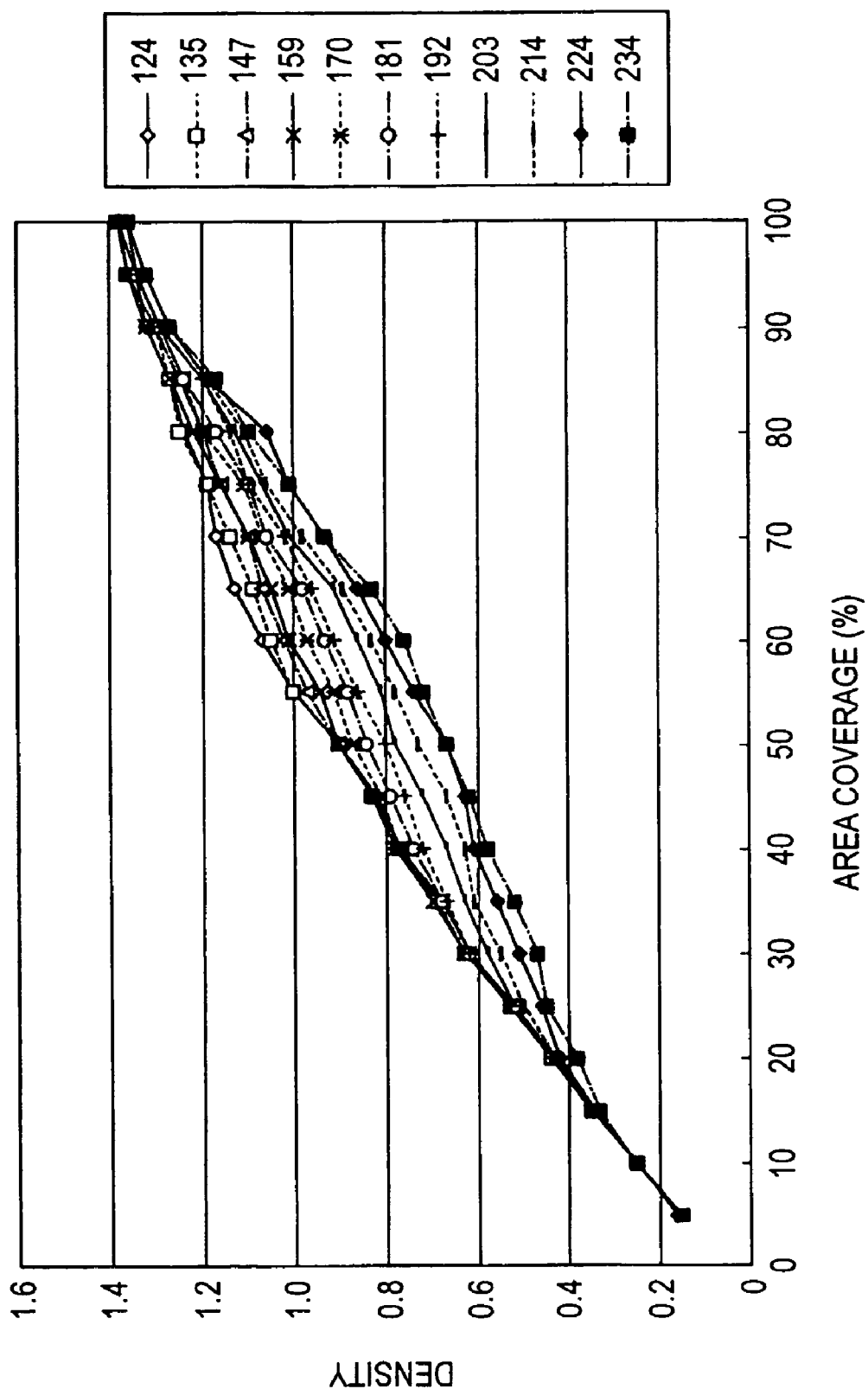
FIG. 10 shows an example of graph formed by plotting measured density of a gradation step image having each area rate formed on the basis of binary image data in the case where the intermediate threshold value is changed from 124 to 234 at a predetermined rate.

FIG. 10 shows an example of a graph with respect to the multi-gradation image data for each of the area coverage, formed by forming binary image data associated with each intermediate threshold value when the intermediate threshold value is changed at a predetermined rate from 124 to 234 and then plotting the measured density of each of the gradation step images formed on the basis of the binary image data thus formed.

As is clear from this graph, when the area coverage is 60%, the quantity of change in the measured density corresponding to a change in the intermediate threshold value increases. It is easier to adjust the intermediate threshold value where the quantity of change is large. Therefore, in this example, giving attention to the area coverage of 60%, at which the quantity of change is large, the intermediate threshold value is derived as follows.

First, a gradation step image having an area coverage of 60% is formed by the binarization processing as in the first embodiment, while the intermediate threshold value is changed. Then, the density (average density) of regions in the formed image corresponding to plural nozzle groups formed by dividing the nozzles 20a arrayed in the recording head array 20 into plural nozzle groups in the order of nozzle arraying as shown in FIG. 9 is measured.

Figure 11:
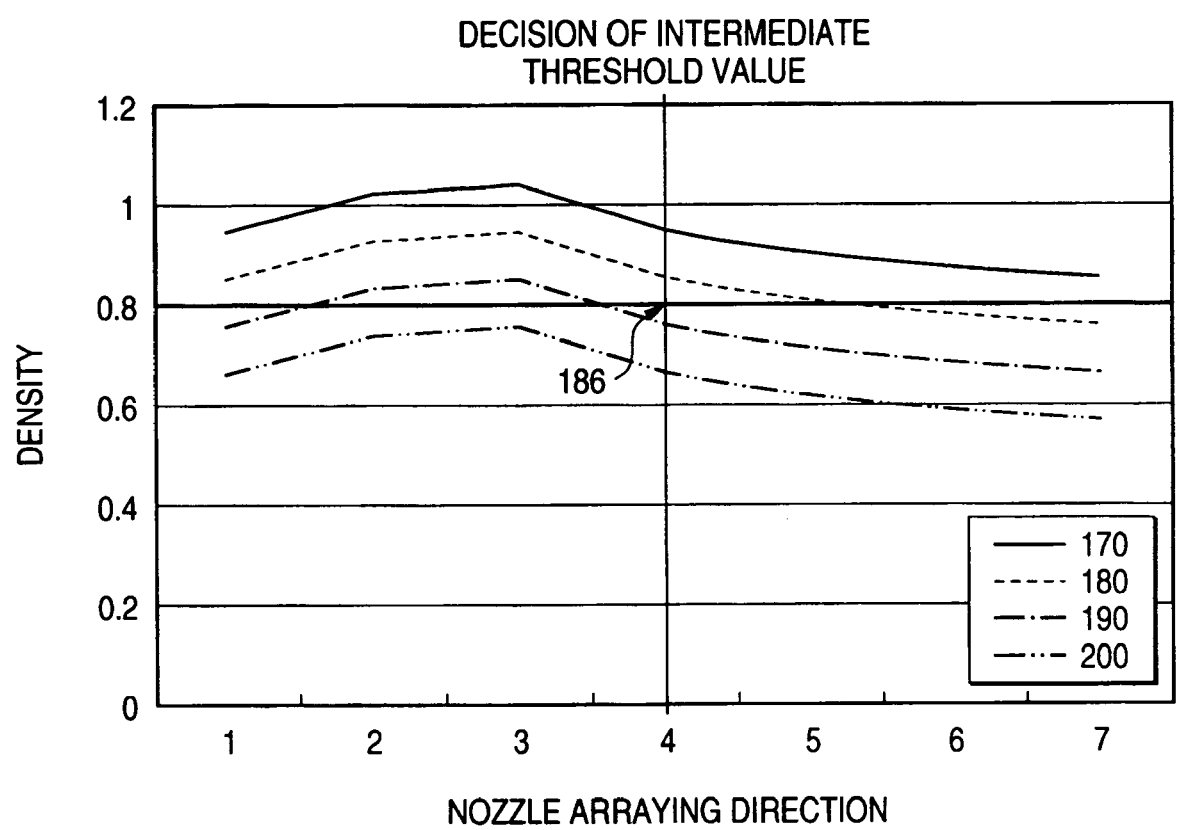
FIG. 11 is a graph showing density profiles in the nozzle arraying direction, of gradation step images formed with intermediate threshold values of 170, 180, 190 and 200.

FIG. 11 is a graph showing density profiles in the nozzle arraying direction, of gradation step images formed with intermediate threshold values of 170, 180, 190 and 200. Here, the measured density for each nozzle group is plotted when the nozzles are divided into seven nozzle groups in the nozzle arraying order.

As is clear from FIG. 11, the density differs for each nozzle group and a density gradient occurs. This density gradient occurs because the direction of ink ejection and the ejected ink drop volume differ for each nozzle group. Therefore, on the basis of the density profiles, the intermediate threshold value is decided to eliminate the density gradient (that is, to realize constant density of the region corresponding to each nozzle group).

For example, to set the density of the regions corresponding to all the nozzle groups to 0.8, the intermediate threshold value for the fourth nozzle group may be approximately 186, which is between 180 and 190, as shown in FIG. 11. Also the intermediate threshold values for the other nozzles groups can be similarly decided to realize the density of 0.8.

In this manner, the intermediate threshold value Xi for each nozzle group is decided on the basis of the density profile in the nozzle arraying direction, and the decided intermediate threshold value Xi is stored into the X value memory 46.

The ratio of the first part and the second part in the dot pattern changes in accordance with the intermediate threshold value Xi. For example, since each dither threshold value relatively increases as the intermediate threshold value Xi increases (that is, as the maximum value of the dither threshold value increases), more pixel data are converted to 0 (black data) in the dither processing and the ratio of the first part increases.

Figure 12:
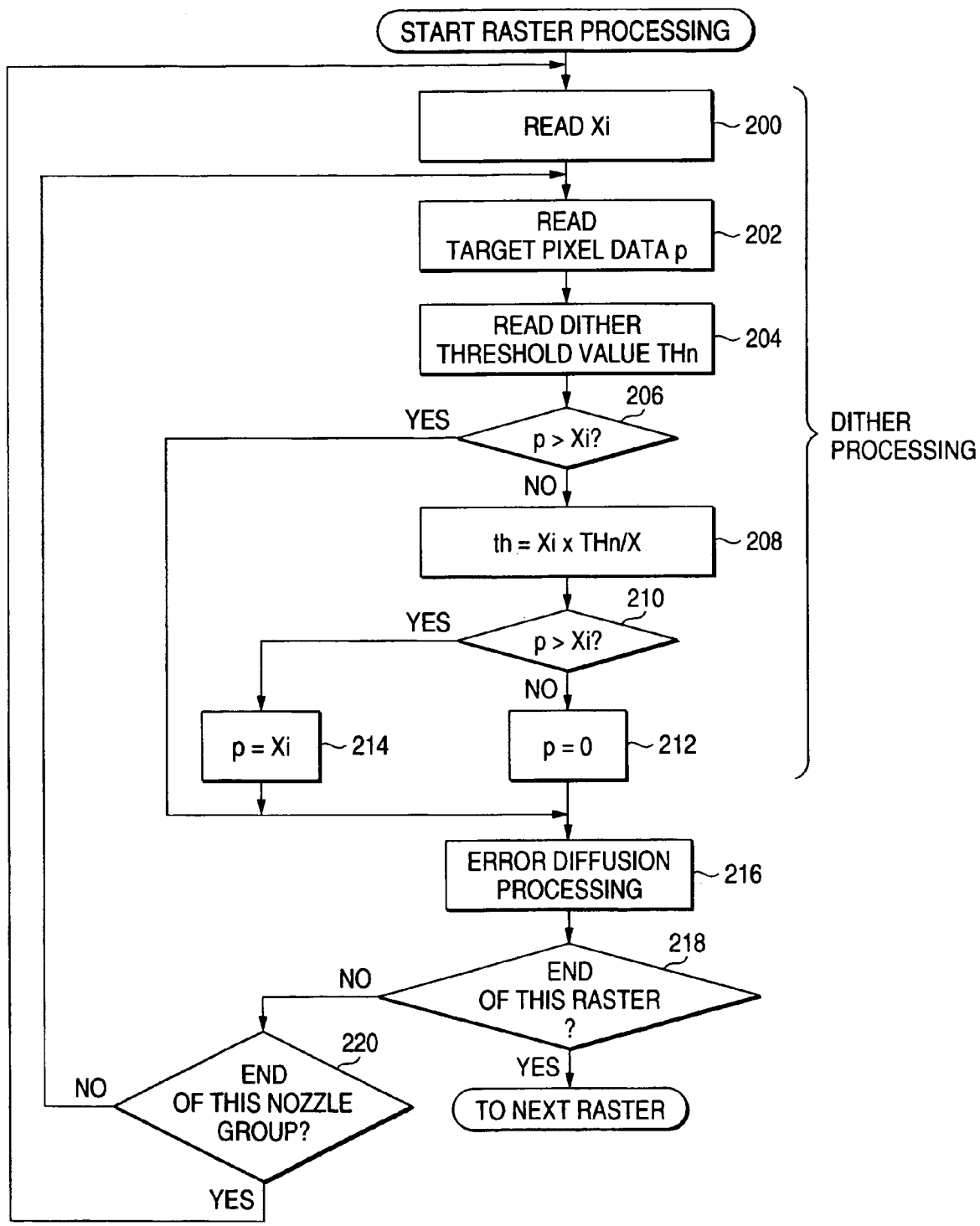
FIG. 12 is a flowchart showing a flow of binarization processing executed by the image processing device according to the second embodiment.

FIG. 12 is a flowchart showing a flow of binarization processing executed by the image processing device 14a according to this embodiment.

At step 200, an intermediate threshold value Xi is read from the X value memory 46. Here, the intermediate threshold value Xi to be read is an intermediate threshold value corresponding to a nozzle group including nozzles that eject ink drops on the basis of pixel data of a processing object.

At step 202, target pixel data p is read from the RAM of the control device 12.

At step 204, dither threshold value THn corresponding to the target pixel data p is read from the reference dither table stored in the dither table memory 44.

At step 206, it is judged whether the value of the target pixel data p is more than the intermediate threshold value Xi or not. If it is judged here that the value of the target pixel data p is equal to or less than the intermediate threshold value Xi, a dither threshold value th for performing the dither processing on the target pixel data p is then calculated by the following equation at step 208.

$$th = Xi \times THn/X$$

In this equation, X is the maximum value of the dither threshold values constituting the reference dither table as described above and it represents a predetermined intermediate threshold value to be a reference. For example, in the case of the dither table shown in FIG. 3, it is 32. THn/X is a standardized dither threshold value and it represents the ratio of each dither threshold value arrayed in the reference dither table to the maximum value X. Therefore, THn/X takes values of 0 to 1. By multiplying this standardized dither threshold value THn/X by the intermediate threshold value Xi defined for each nozzle group, it is possible to find the dither threshold value th corresponding to the intermediate threshold value Xi.

Instead of finding the dither threshold value th by the foregoing equation, each dither table corresponding to the intermediate threshold value Xi may be stored into a predetermined memory, and the corresponding dither threshold value th may be read from the memory.

At step 210, it is judged whether the value of the target pixel data p is more than the dither threshold value th or not. If it is judged here that the value of the target pixel data p is equal to or less than the dither threshold value th, 0 is then substituted into the value of the target pixel data p at step 212. On the other hand, if it is judged that the value of the target pixel data p is more than the dither threshold value th, the intermediate threshold value Xi is then substituted into the value of the target pixel data p at step 214.

After the dither processing or if it is judged at step 210 that the value of the target pixel data p is more than the intermediate threshold value Xi, the error diffusion processing is performed at step 216 to binarize the data to 0 or 1. This processing similar to the processing in the first embodiment and therefore the description is omitted.

At step 218, it is judged whether the processing on pixel data of one raster has been completed or not. If it is judged here that the processing on pixel data of one raster has not been completed, it is then judged at step 220 whether the processing on all the pixel data corresponding to one nozzle group has been completed or not.

If it is judged here that the processing on all the pixel data corresponding to one nozzle group has been completed, the processing returns to step 200 and the intermediate threshold value Xi corresponding to the next nozzle group is read. On the other hand, if it is judged that the processing on all the pixel data corresponding to one nozzle group has not been completed, the dither processing can be performed on the next pixel data, too, by using the same intermediate threshold value as the current intermediate threshold value. Therefore, the processing returns to step 202 and the next pixel data is read as target pixel data p.

Meanwhile, if it is judged at step 218 that the processing on pixel data of one raster has been completed, the binarization processing on the next raster is then started.

As described above, since the intermediate threshold value Xi is decided in accordance with the ink ejection characteristics of each nozzle group to eliminate the density gradient in the nozzle arraying direction and the binarization processing is performed using the decided intermediate threshold value Xi, the ratio of the first part and the second part in the dot pattern can be changed to eliminate the density gradient in the nozzle arraying direction and the image quality can be improved.

In the second embodiment, the example of performing the dither processing by using the intermediate threshold value Xi decided for each nozzle group formed by dividing the nozzles 20a arrayed in the recording head array 20 into plural groups in the order of arraying is described. However, the intermediate threshold value is not limited to this and the dither processing may be performed, for example, by using an intermediate threshold value decided for each nozzle. Also in the case of deciding the intermediate threshold value for each nozzle as described above, the intermediate threshold value can be decided in a manner similar to the foregoing method.

Figure 13:
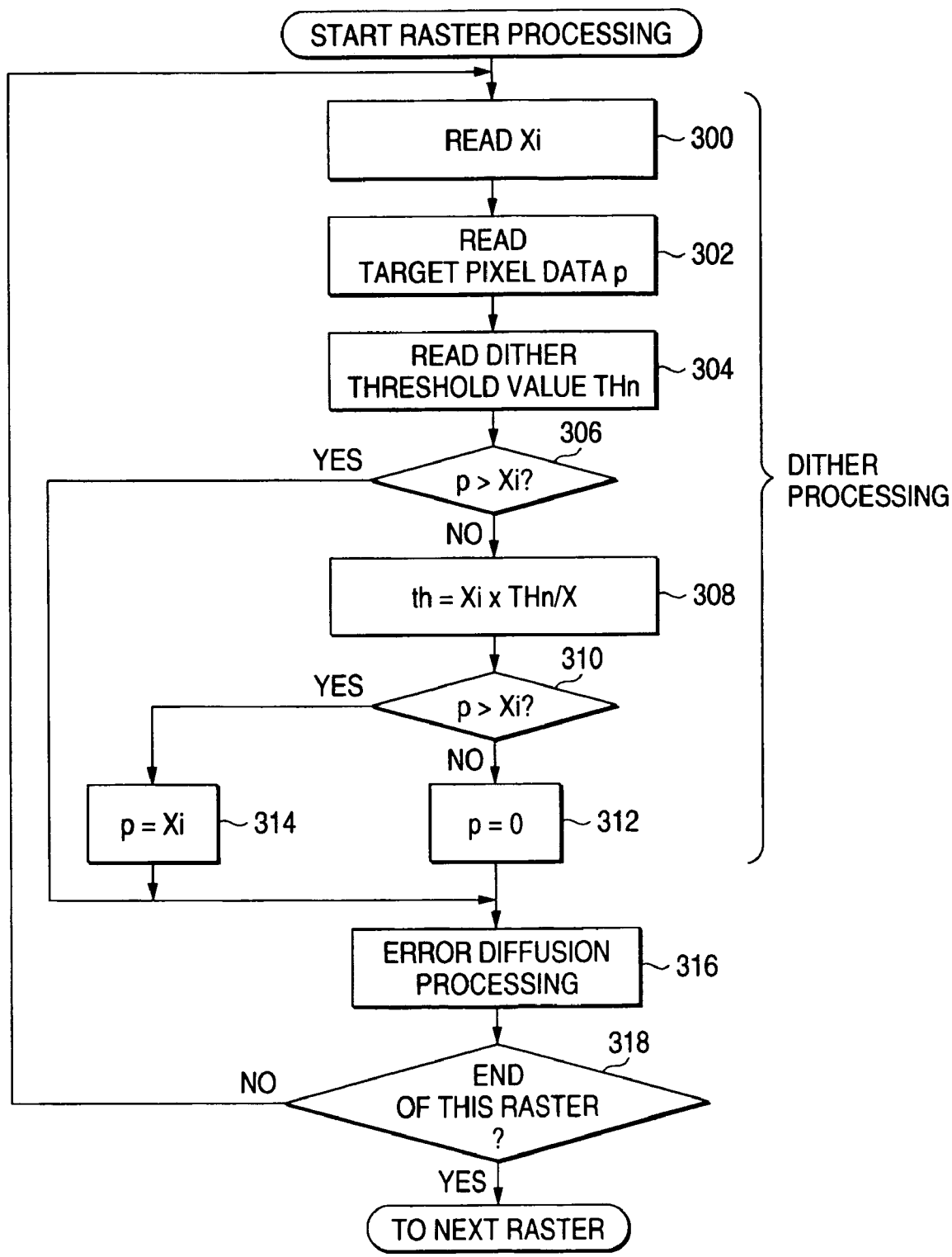
FIG. 13 is a flowchart showing a flow of binarization processing in the case of changing the intermediate threshold value for each nozzle.

FIG. 13 is a flowchart showing a flow of binarization processing in the case of changing the intermediate threshold value for each nozzle.

The processing of steps 300 to 316 in this flowchart is similar to the processing of steps 200 to 216 in the flowchart shown in FIG. 12 and therefore the description is omitted. The subscript "i" of the intermediate threshold value Xi represents each of the nozzles arrayed in the recording head array 20.

At step 318, it is judged whether the processing on pixel data of one raster has been completed or not. If it is judged here that the processing on pixel data of one raster has not been completed, the processing returns to step 300 to read the intermediate threshold value Xi for the nozzle corresponding to the next pixel data and perform the binarization processing on the pixel data. If it is judged that the processing on pixel data of one raster has been completed, the binarization processing on the next raster is then started.

Also in the case of performing the binarization processing while changing the intermediate threshold value for each nozzle in this manner, the ratio of the first part and the second part in the dot pattern can be changed to eliminate the density gradient in the nozzle arraying direction and the image quality can be improved, as in the foregoing embodiment.

In the first and second embodiments, the examples of performing the dither processing and the error diffusion processing consecutively for each pixel data are described. However, the processing is not limited to these examples, and for example, it is also possible to first perform the dither processing on all the pixel data constituting multi-gradation image data or pixel data of a predetermined unit each (for example, each raster or each page) and then collectively perform the error diffusion processing. In the latter case, the pixel data after the dither processing maybe temporarily stored in a buffer memory and the dither-processed pixel data may be sequentially read out from the buffer memory to perform the error diffusion processing.

In the first and second embodiments, the examples of forming the pixel data of the low-density second part including randomly arranged dots by performing the error diffusion processing after the dither processing are described. However, the formation of the pixel data is not limited to this, and for example, the multi-gradation image data may be binarized only by the dither processing to form the first part and the second part, without performing the error diffusion processing at all.

In the case of binarizing the data only by the dither processing, the processing is performed specifically as follows.

Figure 14:
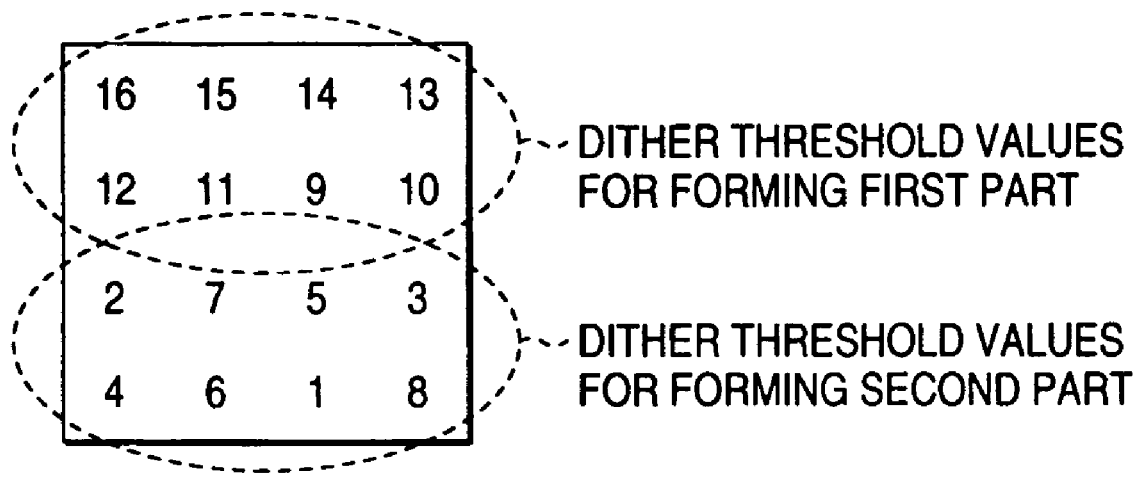
FIG. 14 shows an example of dither table in which dither threshold values are arranged to realize formation of a first part and a second part simply by performing dither processing.

For example, in the case where the multi-gradation image data has 16 gradations, a dither table in which dither threshold values are arranged to enable formation of the first part and the second part only by the dither processing, as shown in FIG. 14, is used, and the processing of steps 104, 206 and 306 to compare the target pixel data with the intermediate threshold value and the error diffusion processing of steps 112, 216 and 316 in the flowcharts of the binarization processing described in the first and second embodiments are omitted.

Moreover, while the examples of converting the multi-gradation image data to the binary image data are described in the first and second embodiments, any image data having lower gradation than the multi-gradation image data may be used and it is not particularly limited to the binary image data.

Furthermore, the ink jet-type image output apparatus is described as an example in the first and second embodiments, the invention is not limited to this and can also be applied to, for example, an electrophotographic image output apparatus (laser printer) using an electrostatic process. Even in the case of a laser printer, white streaks and density gradient may occur depending on the state of the apparatus, for example, the flexure state of a transfer belt, cyclic variation and inclination of a photosensitive drum and the like. Therefore, by measuring the state (output characteristics) of the apparatus in advance, finding the intermediate threshold value in accordance with the output characteristics, and performing the processing as in the first and second embodiments, it is possible to form a high-quality image in which no streaks and density gradient occur.

Also, in the embodiments, the examples of performing the dither processing and the error diffusion processing on the multi-gradation image data in which the gradation value of the maximum density (black) is expressed by the minimum gradation value "0" and in which the density is lowered (i.e., it becomes closer to white) as the gradation value increases, are described. However, on multi-gradation image data having the opposite gradation values, that is, multi-gradation image data in which the gradation value of the minimum density (white) is expressed by the minimum gradation value "0" and in which the density increases (i.e., it becomes close to black) as the gradation value increases, the dither processing and the error diffusion processing can be performed as in the embodiments and the similar effects can be achieved.

As described above, according to an embodiment of this invention, an image processing device converts multi-gradation image data to low-gradation image data for outputting an image of a dot pattern that is formed by a high-density first part formed in a band shape by dots connected in a predetermined direction and a low-density second part formed by randomly arranged dots.

That is, this image processing device converts multi-gradation image data to low-gradation image data for outputting an image of a dot pattern that is formed by a first part and a second part having different dot densities. The first part is a high-density part formed in a band shape by dots connected in a predetermined direction. The second part is a low-density part formed by randomly arranged dots.

Figure 15:
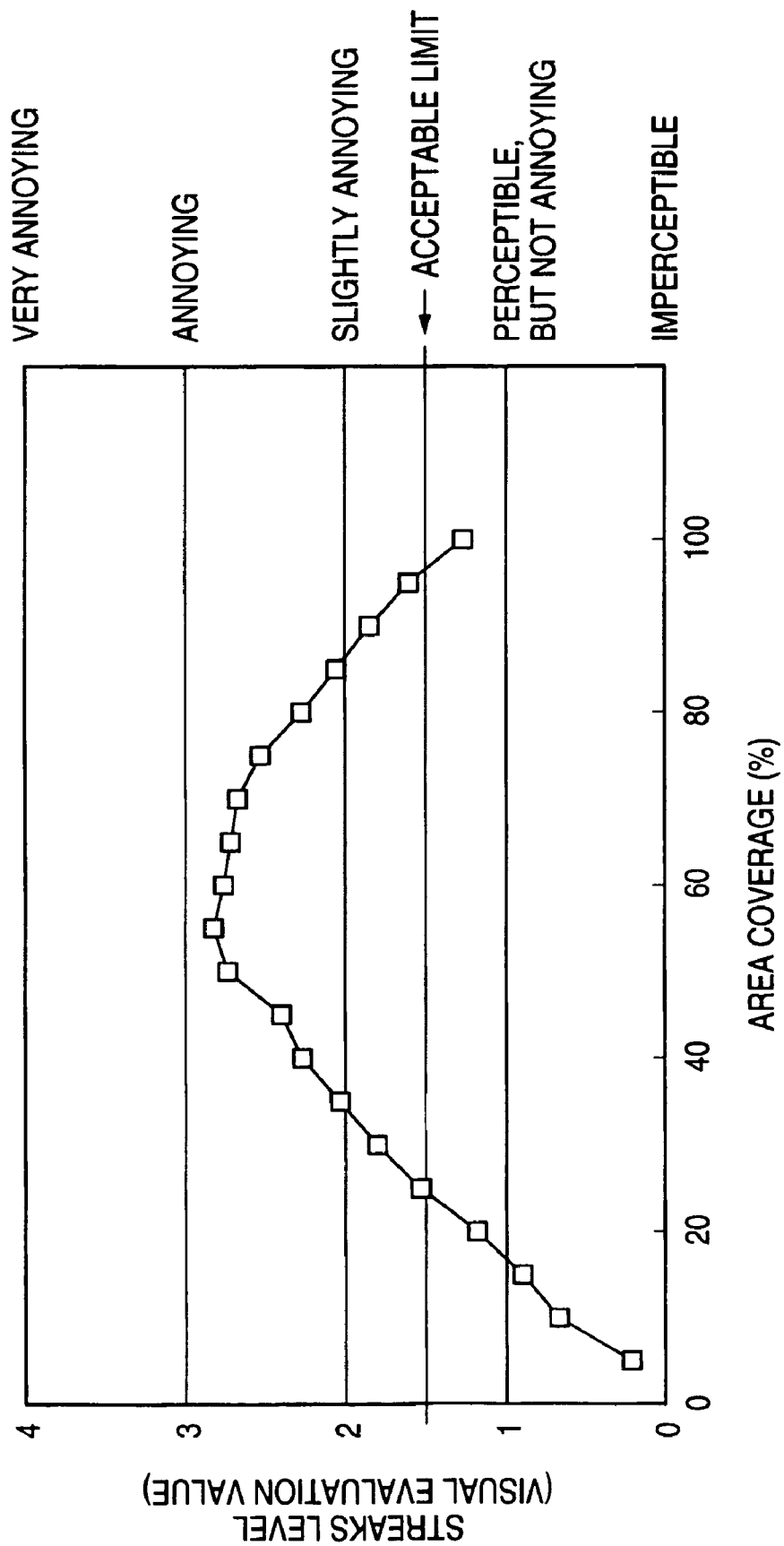
FIG. 15 is a graph showing an example of streak occurrence level with respect to each area coverage in the case where an image is outputted while the area coverage is sequentially changed by 5% from 5% to 100% in an ink jet-type image output apparatus that converts multi-gradation image data to binary image data by typical error diffusion processing and outputs an image based on the binary image data.

FIG. 15 is a graph showing an example of streak occurrence level for each area coverage, in the case where an image is outputted with the area coverage (dot density per unit area) sequentially changed by 5% from 5% to 100% in an ink jet-type image output apparatus that converts multi-gradation image data to binary image data by typical error diffusion processing and outputs an image based on the binary image data. Streaks occur because of the unevenness of the ejection characteristics (ejected ink drop volume and direction of ejection) of nozzles that eject ink drops. The streak occurrence level is expressed by visual evaluation values of 0 to 4. Level 0 is a level at which streaks is "imperceptible". Level 1 is a level at which the streaks is "perceptible ,but not annoying". Level 2 is a level at which the streaks is "slightly annoying". Level 3 is a level at which the streaks is "annoying". Level 4 is a level at which the streaks is "very annoying".

In the example shown in FIG. 15, in the case of intermediate density where the area coverage is approximately 30 to 90%, streaks more or less annoy the user. In the case of low density where the area coverage is equal to or less than 30%, or high density where the area coverage is equal to or more than 90%, the occurrence of streaks is at an acceptable level or less at which the streaks do not annoy the user very much.

This is because in the high-density part, the dot spacing is small and a portion where streaks tend to occur is filled with dots, thus restraining the occurrence of streaks, whereas in the low-density part, as the dot density is low and dots are dispersed, even when some streaks occur, they are not very visible because of the low dot density and large dot spacing.

Therefore, by converting multi-gradation image data to low-gradation image data for outputting an image of a dot pattern that is formed by a high-density first part formed in a band shape by dots connected in a predetermined direction and a low-density second part formed by randomly arranged dots, as in the embodiment of this invention, it is possible to restrain the occurrence of streaks due to unevenness of the output characteristics of an image output apparatus that outputs an image on the basis of the low-gradation image data or to make the streaks inconspicuous to improve the image quality.

In the dot pattern formed by the two parts, a pattern like worm texture is not likely to emerge.

The low-gradation image data may be any image data having lower gradation than the multi-gradation image data and is not limited to binary image data.

Also, the multi-gradation image data may be converted to the low-gradation image data for outputting the image of the dot pattern that is formed by the first part and the second part by performing dither processing to convert multi-gradation image data ranging from a gradation value representing a maximum density to a predetermined gradation value to the gradation value representing the maximum density or the predetermined gradation density by using a threshold value table in which dither threshold values are arrayed to realize a line of dots connected in a predetermined direction with its width gradually increasing, and then performing error diffusion processing on multi-gradation image data having lower density than the density represented by the predetermined gradation value and the dither-processed data.

That is, the dither processing is combined with the error diffusion processing to convert multi-gradation image data. As the dither processing to convert multi-gradation image data ranging from a gradation value representing a maximum density to a predetermined gradation value to the gradation value representing the maximum density or the predetermined gradation density by using a threshold value table in which dither threshold values are arrayed to realize a line of dots connected in a predetermined direction with its width gradually increasing, image data for outputting the first part can be acquired. Moreover, as the error diffusion processing is performed on multi-gradation image data having lower density than the density represented by the predetermined gradation value and the dither-processed data, image data for outputting the second part can be acquired.

Also, the multi-gradation image data may be converted to the low-gradation image data for outputting the image of the dot pattern that is formed by the first part and the second part by performing dither processing using a threshold value table in which dither threshold values are arrayed to realize formation of the first part and the second part.

This enables high-speed conversion of multi-gradation image data.

The ratio of the first part and the second part in the dot pattern may be set to eliminate the density gradient generated by unevenness of output characteristics of an image output apparatus that outputs an image based on the low-gradation image data.

As the ratio of the first part and the second part is thus set, the density gradient generated by unevenness of the output characteristics of the image output apparatus that outputs an image can be eliminated.

The image output apparatus may be an ink jet-type image output apparatus or an electrophotographic image output apparatus using an electrostatic process. The image output apparatus is not particularly limited.

An image output apparatus according to an embodiment of this invention has an image processing unit that converts multi-gradation image data to low-gradation image data for outputting an image of a dot pattern that is formed by a high-density first part formed in a band shape by dots connected in a predetermined direction and a low-density second part formed by randomly arranged dots, and an image output unit that outputs an image based on the low-gradation image data acquired by the conversion by the image processing unit.

The image output apparatus according to an embodiment of this invention includes the image processing unit and the image output unit. The image processing unit acts similarly to the image processing device according to an embodiment of this invention. The image output unit outputs an image based on the low-gradation image data acquired by the conversion by the image processing unit.

Also the image output apparatus according to an embodiment of this invention can convert multi-gradation image data to low-gradation image data and output an image based on the low-gradation image data, acting similarly to the image processing device according to an embodiment of this invention. Therefore, it can restrain the occurrence of streaks due to unevenness of output characteristics of the image output unit or make the streaks inconspicuous, thus improving the image quality.

The image output unit may be a unit that includes a recording head in which plural nozzles ejecting ink drops are arrayed and that causes the nozzles to eject ink drops to output an image on the basis of the low-gradation image data acquired by the conversion by the image processing unit.

That is, the image output apparatus according to an embodiment of this invention can bean ink jet-type image output apparatus. This image output apparatus may be a PWA-type image output apparatus that performs printing by moving a recording head in a main scanning direction while moving a recording sheet in a sub scanning direction, or a so-called FWA-type image output apparatus that has an elongated recording head having a width substantially equal to the width of the recording sheet and performs recording by only moving the recording medium while fixing the recording head.

In the case where the image output apparatus according to an embodiment of this invention is an ink jet-type image output apparatus as described above, the predetermined direction may be the nozzle arraying direction. Moreover, the ratio of the first part and the second part in the dot pattern can be set to eliminate the density gradient generated by unevenness of ejection characteristics of the nozzles.

Thus, the density gradient due to the unevenness of the ejection characteristics of the nozzles can be eliminated. The ejection characteristics of the nozzles refer to, for example, the ejected ink drop volume and the direction of ejection.

The image output apparatus according to an embodiment of this invention is not limited to the ink jet-type image output apparatus and can be an electrophotographic image output apparatus using an electrostatic process.

In a storage medium storing an image processing program according to an embodiment of this invention, the program causes a computer to execute processing to convert multi-gradation image data to low-gradation image data for outputting an image of a dot pattern that is formed by a high-density first part formed in a band shape by dots connected in a predetermined direction and a low-density second part formed by randomly arranged dots.

Also in the storage medium storing the image processing program according to an embodiment of this invention, since the program acts similarly to the image processing device according to an embodiment of this invention, it can restrain the occurrence of streaks due to unevenness of output characteristics of an image output unit or make the streaks inconspicuous, thus improving the image quality.

In the storage medium storing the image processing program according to an embodiment of this invention, the ratio of the first part and the second part in the dot pattern may be set to eliminate the density gradient generated by unevenness of output characteristics of the image output apparatus that outputs an image based on the low-gradation image data.

As the ratio of the first part and the second part is thus set, the density gradient generated by unevenness of the output characteristics of the image output apparatus that outputs an image can be eliminated.

As described above, the image processing device, the image output apparatus, and the storage medium storing an image processing program according to embodiments of this invention have an excellent effect that it is possible to restrain the occurrence of streaks due to unevenness of output characteristics of the image output apparatus or make the streaks inconspicuous and to improve the image quality.

The foregoing description of the embodiments of this invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-259494 filed on Sep. 7, 2004 including specification, claims, drawings and abstract is incorporated herein by reference in its entirety.

What is claimed is:

1. An image processing method for use in an image processing device that converts multi-gradation image data to low-gradation image data for outputting an image of a dot pattern that is formed by a high-density first part formed in a band shape by dots connected in a predetermined direction and a low-density second part formed by randomly arranged dots, the image processing device including a dither processing unit and an error diffusion processing unit, the method comprising:

the dither processing unit performing dither processing to convert multi-gradation image data ranging from a gradation value representing a maximum density to a predetermined gradation density to the gradation value representing the maximum density or the predetermined gradation density by using a threshold value table in which dither threshold values are arrayed to realize a line of dots connected in a predetermined direction with its width gradually increasing, and maintaining multi-gradation image data having lower density than the density represented by the predetermined gradation density at original gradation values; and the error diffusion processing unit then performing error diffusion processing on the multi-gradation image data having lower density than the density represented by the predetermined gradation density and the dither-processed data.

2. The image processing method as claimed in claim 1, including setting the ratio of the first part and the second part in the dot pattern to eliminate the density gradient in the predetermined direction generated by unevenness of output characteristics of an image output apparatus that outputs an image based on the low-gradation image data.

3. An image output method for use in an image output apparatus including an image processing unit and an image output unit, the image processing unit having a dither processing unit and an error diffusion processing unit. The method comprising:

the image processing unit converting multi-gradation image data to low-gradation image data for outputting an image of a dot pattern that is formed by a high-density first part formed in a band shape by dots connected in a predetermined direction and a low-density second part formed by randomly arranged dots, wherein the dither processing unit performs dither processing to convert multi-gradation image data ranging from a gradation value representing a maximum density to a predetermined gradation density to the gradation value representing the maximum density or the predetermined gradation density by using a threshold value table in which dither threshold values are arrayed to realize a line of dots connected in a predetermined direction with its width gradually increasing, and maintaining multi-gradation image data having lower density than the density represented by the predetermined gradation density at original gradation values, and then the error diffusion processing unit performs error diffusion processing on the multi-gradation image data having lower density than the density represented by the predetermined gradation density and the dither-processed data; and the image output unit outputting an image based on the low-gradation image data acquired by the conversion by the image processing unit.

4. The image output method as claimed in claim 3, wherein the image output unit comprises a recording head in which a plurality of nozzles ejecting ink drops are arrayed, the image output unit causing the nozzles to eject ink drops to output an image on the basis of the low-gradation image data acquired by the conversion by the image processing unit.

5. The image output method as claimed in claim 4, wherein the predetermined direction is the nozzle arraying direction.

6. The image output method as claimed in claim 4, including setting the ratio of the first part and the second part in the dot pattern to eliminate the density gradient in the predetermined direction generated by unevenness of ejection characteristics of the nozzles.

7. A storage medium storing an image processing program, the program causing a computer to execute processing to convert multi-gradation image data to low-gradation image data for outputting an image of a dot pattern that is formed by a high-density first part formed in a band shape by dots connected in a predetermined direction and a low-density second part formed by randomly arranged dots;

wherein the image processing program converts the multi-gradation image data to the low-gradation image data for outputting the image of the dot pattern that is formed by the first part and the second part, by performing dither processing to convert multi-gradation image data ranging from a gradation value representing a maximum density to a predetermined gradation density to the gradation value representing the maximum density or the predetermined gradation density by using a threshold value table in which dither threshold values are arrayed to realize a line of dots connected in a predetermined direction with its width gradually increasing, and maintaining multi-gradation image data having lower density than the density represented by the predetermined gradation density at original gradation values, and then performing error diffusion processing on the multi-gradation image data having lower density than the density represented by the predetermined gradation density and the dither-processed data.

8. The storage medium storing the image processing program as claimed in claim 7, wherein the ratio of the first part and the second part in the dot pattern is set to eliminate the density gradient in the predetermined direction generated by unevenness of output characteristics of the image output apparatus that outputs an image based on the low-gradation image data.

* * * * *